United States Patent Office 3,418,382
Patented Dec. 24, 1968

3,418,382
CONVERSION OF MERCAPTANS TO ALCOHOLS
Robert A. Dombro, Chicago, Ill., assignor to Universal Oil Products Company, Des Plaines, Ill., a corporation of Delaware
No Drawing. Filed Dec. 10, 1965, Ser. No. 513,124
9 Claims. (Cl. 260—632)

ABSTRACT OF THE DISCLOSURE

Conversion of a hydrocarbyl mercaptan to the corresponding alcohol by heating the mercaptan in solution with a basic compound and a mild oxidizing agent at 100°–300° C. The mercaptan is characterized in that the carbon atom of the hydrocarbyl moiety bonded to the sulfur atom of the thiol group has at least one hydrogen atom attached thereto.

---

This invention relates to a novel process for the conversion of mercaptans to the corresponding alcohols.

The direct oxidation of hydrocarbons utilizing atmospheric oxygen is a relatively inexpensive process. However, the oxidation reaction mixture invariably comprises a mixture of first, second and third stage oxidation products, e.g., alcohols, ketones and aldehydes, carboxylic acids, and the like. In those cases where it has been possible to inhibit the oxidation past the first stage to give principally an alcohol product, said product comprises a mixture of secondary alcohols, the extent of the mixture depending upon the number of carbon atoms in the alcohol chain. In many cases it is desirable not only to produce alcohols to the substantial exclusion of other oxidation products, but also to produce primary alcohols. For example, it is generally considered that primary alcohols when utilized in the manufacture of plasticizers give a product of greater thermal and oxidation stability.

It is an object of this invention to present a novel and relatively inexpensive process for the preparation of alcohols to the exclusion of higher oxidation products. It is a further object to present a novel process uniquely adapted to the preparation of primary alcohols. In one of its broad aspects the present invention embodies a process for converting a mercaptan to an alcohol which comprises heating a mercaptan in solution with a basic compound and a mild oxidizing agent at a temperature of from about 100° C. to about 300° C., said mercaptan being characterized in that the carbon atom bonded to the sulfur atom of the thiol group has at least one hydrogen atom attached thereto, and said basic compound being selected from the group consisting of the alkali metal and alkaline earth metal hydroxides and alkoxides. Other objects and embodiments of this invention wil become apparent in the following detailed specification.

Mercaptans, or thio substituted hydrocarbons, which can be utilized in accordance with the process of this invention are represented by the general formula

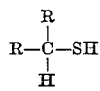

wherein R is independently selected from the group consisting of alkyl, cycloalkyl, aryl, alkaryl, aralkyl and hydrogen, or the two R groups may comprise alkylene groups which, taken together with the carbon atom to which they are attached, comprise a carbocyclic ring as, for example, in the case of cyclopentanethiol, cyclohexanethiol, and the like. Suitable mercaptan starting materials thus include methanethiol, ethanethiol, 1-propanethiol, 2-propanethiol, 1-butanethiol, 2-methyl-1-propanethiol, 2-methyl-2-propanethiol, and higher homologs thereof containing up to about 20 carbon atoms, particularly 1-decanethiol, 1-undecanethiol, 1-dodecanethiol, etc., which are useful in producing long straight chain primary alcohols. The alcohol product is determined by the mercaptan starting material which is selected accordingly. Aromatic mercaptans which can be utilized to prepare the corresponding alcohols include α-toluenethiol, 2-phenyl-1-ethanethiol, and the like.

Pursuant to the present process, the mercaptan starting material is heated in solution with a basic compound and oxidizing agent. Basic compounds herein contemplated comprise the alkali metal and alkaline earth metal hydroxides and alkoxides. Thus, suitable basic compounds include the alkali metal and alkaline earth metal hydroxides such as sodium hydroxide, potassium hydroxide, lithium hydroxide, cesium hydroxide, rubidium hydroxide, beryllium hydroxide, magnesium hydroxide, calcium hydroxide, strontium hydroxide, barium hydroxide, etc., and also alkali metal and alkaline earth metal alkoxides, particularly the sodium and potassium alkoxides such as sodium methoxide, potassium methoxide, sodium ethoxide, potassium ethoxide, sodium propoxide, potassium propoxide, sodium isopropoxide, potassium isopropoxide, sodium butoxide, potassium butoxide, sodium isobutoxide, potassium isobutoxide, potassium t-butoxide, sodium t-butoxide, and the like. The selected basic compound is preferably utilized in at least a slight molar excess with respect to the mercaptan reactant, preferably a molar excess of about 2:1 or more.

The mild oxidizing agents utilized herein preferably include sulfoxides and the alkali metal and alkaline earth metal hypochlorites although other mild oxidizing agents including air, potassium peroxysulfate, copper sulfate, hydrogen peroxide, ferric oxide, cupric oxide, etc. are operable to obtain the desired products but not necessarily with the same or equivalent results. The sulfoxides are represented by the general formula

wherein R and R' may be the same or different alkyl, cycloalkyl, aryl, alkaryl or aralkyl radical. Sulfoxides thus include dialkyl sulfoxides such as dimethyl sulfoxide, diethyl sulfoxide, di-n-propyl sulfoxide, diisopropyl sulfoxide, di-n-butyl sulfoxide, diisobutyl sulfoxide, methylsulfinyl ethane, methsulfinyl propane, etc., as well as cycloalkyl sulfoxides like tetramethylene sulfoxide, pentamethylene sulfoxide, and the like, and also diaryl sulfoxides such as diphenyl sulfoxide, diaralkyl sulfoxides like dibenzyl sulfoxide, dialkaryl sulfoxides like di-p-tolyl sulfoxide, etc. The alkali metal and alkaline earth metal hypochlorites include sodium hypochlorite, potassium hypochlorite, lithium hypochlorite, cesium hypochlorite, rubidium hypochlorite, beryllium hypochlorite, magnesium hypochlorite, calcium hypochlorite, strontium hypochlorite, barium hypochlorite, etc., the alkali metal hypochlorites and particularly sodium and potassium hypochlorites being preferred. The selected oxidizing agent is preferably employed in at least equimolar amounts with respect to the mercaptan reactant.

As hereinbefore mentioned, the selected mercaptan is heated in solution with the basic compound and the oxidizing agent. Any suitable solvent substantially inert at reaction conditions can be employed. The lower alcohols such as methanol, ethanol, isopropanol, and the like have been found to be particularly useful to solubilize the reactants. Reaction conditions relate principally to temperature, a temperature of from about 100° C. to about 300° C. being operable, a temperature of from about 150° C. to about 250° C. being preferred. Pressure does not appear to be an important variable except that superatmospheric pressures may be employed to effect a liquid phase reaction.

By the process of this invention, mercaptans are converted to the corresponding alcohols to the exclusion of higher oxidation products. The process is particularly useful in the preparation of primary alcohols, the necessary primary alkyl mercaptan starting material being conveniently prepared, for example, by the anti-Markovnicov addition of hydrogen sulfide to a terminal olefin in the presence of ultraviolet light or trace amounts of a peroxide as has been disclosed in the art.

The process of this invention is further illustrated by the following examples. It is not intended that said examples serve as an undue limitation on the generally broad scope of the invention as set out in the appended claims.

EXAMPLE I

About 0.5 mole of 1-pentanethiol, 1.5 moles of potassium hydroxide in 200 cc. of methanol, and 0.5 mole of dimethyl sulfoxide were charged to a glass liner and sealed in an 850 cc. rotatable autoclave under 30 atmospheres initial nitrogen pressure. The autoclave was rotated and heated at a temperature ranging from 100° C. to 200° C. over a period of 5 hours. The autoclave was depressured and a clear yellow liquid product recovered therefrom. Distillation at atmospheric pressure gave about 10 cc. of n-pentyl alcohol, about a 14% yield, identified by infrared and gas-liquid chromatography analysis methods.

EXAMPLE II

About 0.5 mole of α-toluenethiol, 1.0 mole of potassium hydroxide in 150 cc. of methanol and 50 cc. of water, and 0.7 mole of dimethyl sulfoxide were charged to a glass liner and sealed in an 850 cc. rotatable autoclave under 30 atmospheres initial nitrogen pressure. The autoclave was rotated and heated at a temperature ranging from 100° C. to 200° C. over a period of 5 hours. The autoclave was thereafter cooled and vented to the atmosphere. Atmospheric distillation of the liquid product gave 0.2 mole of benzyl alcohol boiling at 202–206° C.

EXAMPLE III

About 0.25 mole of 1-octanethiol, 1 mole of sodium hydroxide in 150 cc. of ethyl alcohol, and 186 grams of a 5.25% aqueous sodium hypochlorite solution was charged to a glass liner and sealed in an 850 cc. rotatable autoclave under 30 atmospheres initial nitrogen pressure. The autoclave was rotated and heated at a temperature of from 100 to 200° C. over a period of 5 hours. The autoclave was thereafter cooled and vented to the atmosphere. Distillation of the liquid product yielded a 15% yield of n-octyl alcohol.

I claim as my invention:

1. A process for preparing an alcohol which comprises heating in solution a compound of the formula

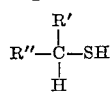

wherein R′ and R″ are selected from the group consisting of alkyl, cycloalkyl, aryl, alkaryl, aralkyl and hydrogen or, together with the carbon to which they are attached, a carbocyclic ring, with a molar excesss of a basic compound selected from the group consisting of alkali metal hydroxides and alkoxides and alkaline earth metal hydroxides and alkoxides and at least one mole of a mild oxidizing agent selected from the group consisting of hydrocarbyl sulfoxides, alkali metal hypochlorites and alkaline earth metal hypochlorites to convert said mercaptan to the corresponding alcohol and recovering the alcohol from the reaction mixture.

2. The process of claim 1 further characterized in that said mercaptan is an alkyl mercaptan in which the alkyl group contains up to 20 carbon atoms.

3. The process of claim 2 further characterized in that said basic compound is an alkali metal hydroxide.

4. The process of claim 3 further characterized in that said oxidizing agent is a dialkyl sulfoxide.

5. The process of claim 4 further characterized in that said dialkyl sulfoxide is dimethyl sulfoxide.

6. The process of claim 3 further characterized in that said oxidizing agent is an alkali metal hypochlorite.

7. The process of claim 6 further characterized in that said hypochlorite is sodium hypochlorite.

8. The process of claim 5 further characterized in that said alkali metal hydroxide is sodium hydroxide.

9. The process of claim 8 further characterized in that said alkyl mercaptan is 1-octanethiol.

References Cited

UNITED STATES PATENTS

| | | | |
|---|---|---|---|
| 2,593,761 | 4/1952 | Johnstone | 260—632 |
| 2,837,573 | 6/1958 | Mavity | 260—632 |

FOREIGN PATENTS

| | | |
|---|---|---|
| 757,149 | 9/1956 | Great Britain. |

OTHER REFERENCES

Reid (I): "Org. Chem. of Bivalent S," vol. I (1959), pp. 19, 111, 112, and 128 to 141, QD412 SIR4.

Reid (III): "Org. Chem of Bivalent S," vol. III (1960), pp. 363, 372, 375 and 376, QD412 SIR4.

Billheimer et al.: "J. Am. Chem. Soc.," vol. 52 (1930), pp. 4338 to 4344, QDIA5.

Kharasch: "Org. S. Cmpds.," vol. I (1961), pp. 173, 174, QD412 SIO7.

Mack et al.: "Text of Chem.," (1949) p. 396.

LEON ZITVER, *Primary Examiner.*

J. E. EVANS, *Assistant Examiner.*

U.S. Cl. X.R.

260—631, 617, 618